United States Patent
Wakazono

(10) Patent No.: US 9,322,745 B2
(45) Date of Patent: Apr. 26, 2016

(54) TIRE TESTING METHOD AND TIRE TESTING MACHINE

(71) Applicant: Kobe Steel, Ltd., Kobe-shi (JP)

(72) Inventor: Takehiko Wakazono, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 212 days.

(21) Appl. No.: 14/258,178

(22) Filed: Apr. 22, 2014

(65) Prior Publication Data

US 2014/0373613 A1 Dec. 25, 2014

(30) Foreign Application Priority Data

Jun. 19, 2013 (JP) .................................. 2013-128108

(51) Int. Cl.
*G01M 17/02* (2006.01)

(52) U.S. Cl.
CPC ............ *G01M 17/02* (2013.01); *G01M 17/022* (2013.01)

(58) Field of Classification Search
None
See application file for complete search history.

(56) References Cited

U.S. PATENT DOCUMENTS

| | | | | |
|---|---|---|---|---|
| 4,577,497 A * | 3/1986 | Ray | ................... | G01M 17/0072 73/126 |
| 6,016,695 A | 1/2000 | Reynolds et al. | | |
| 6,386,031 B2 * | 5/2002 | Colarelli, III | ....... | G01M 17/022 73/460 |
| 6,513,372 B2 * | 2/2003 | Anno | ................... | G01M 17/022 73/146 |
| 6,658,936 B2 * | 12/2003 | Matsumoto | ........... | G01M 1/045 73/460 |
| 8,424,371 B2 * | 4/2013 | Seitz | ..................... | G01M 1/365 73/146 |
| 2013/0334754 A1 | 12/2013 | Wakazono et al. | | |

FOREIGN PATENT DOCUMENTS

JP 2012-181153 9/2012

OTHER PUBLICATIONS

Extended Search Report issued Oct. 1, 2014 in European Patent Application No. 14165816.1.

* cited by examiner

*Primary Examiner* — Peter Macchiarolo
*Assistant Examiner* — Jermaine Jenkins
(74) *Attorney, Agent, or Firm* — Oblon, McClelland, Maier & Neustadt, L.L.P.

(57) ABSTRACT

To prevent occurrence of a slip between a tire and a drum and a flat spot on the tire and to reduce cycle time at a time of testing the tire, this tire testing method includes causing a control mechanism to control a motor to drive the tire to rotate at a predetermined rotational speed lower than a specified rotational speed if a linear sensor detects that the tire transported onto a center conveyor is sandwiched between an upper spindle and a lower spindle, and to control a moving mechanism to move a drum until the drum contacts the tire that rotates at the predetermined rotational speed. If a load cell detects the contact between the tire and the drum, then the control mechanism accelerates the rotation of the tire from the predetermined rotational speed to the specified rotational speed and increases a load applied to the tire by the drum, and the tire is tested.

4 Claims, 4 Drawing Sheets

TIRE TESTING METHOD AND TIRE TESTING MACHINE

BACKGROUND OF THE INVENTION

1. Field of the Invention

The present invention relates to a method for testing a tire and a tire testing machine.

2. Description of the Related Art

Hitherto, a tire mounted on a vehicle or the like often has non-uniform circumferential portions in modulus of elasticity, dimensions, and shapes since the tire is produced by laminating various materials such as rubber, chemical fiber, and steel cord. Reactive forces of components changing periodically depending on road surfaces during high speed rotation and vibrations are generated in such non-uniform portions of the tire, and these cause degradation in traveling performance. These intended uniform performances of the tire are generally referred to as "tire uniformity". To this end, a circumferential uniformity test is conducted on the tire by a tire testing machine after the tire is subjected to vulcanization molding. This tire testing machine tests the tire with the tire driven to rotate while pressing the outer circumference of the tire against a drum (road-surface substitute member) after fitting a bead portion on the inner circumference of the tire into a rim member, attaching the tire to rotating spindles, and then applying a predetermined internal pressure to the tire.

In the tire testing machine, a plurality of conveyers are connected to one another as tire testing conveyors for feeding a test target tire to the central position of the spindles, and the tire is fed to the central position of the spindles in a state in which the tire lies on its side. Note that there is also known a tire testing machine configured to attach the tire to the spindles in a state of standing up with the spindles lying on its side.

Hitherto, the tire testing machine tests the tire by, after securing the tire by chucks, accelerating the rotation of the tire to reach a specified rotational speed (60 rpm for the uniformity test), rotating the tire at the specified rotational speed, and contacting the drum with the tire that rotates at the specified rotational speed. However, the conventional tire testing method and tire testing machine have the following problems. Since the drum is made to contact the rotating tire and the drum rotates to follow the rotation of the tire, a slip occurs between the tire and the drum and the surface of the drum scrapes off that of the tire at a time of the initial rotation of the drum. As a result, the surface of the drum is disadvantageously contaminated with tire rubber at an early time.

To prevent the early contamination of the drum, a tire testing machine disclosed in U.S. Pat. No. 6,016,695 tests a tire by, after securing the tire by chucks, contacting a drum with the tire in a stationary state and accelerating the rotation of the tire to increase the rotational speed of the tire to a specified rotational speed for the test.

SUMMARY OF THE INVENTION

However, the tire testing machine disclosed in U.S. Pat. No. 6,016,695 has the following problems. If the rotation of the tire is accelerated to increase the rotational speed to the specified rotational speed in a state of contacting the drum with the stationary tire, and the tire is rapidly accelerated at a time of rotating the tire, then the surface of the tire in contact with the drum is scraped off, a flat spot occurs on the tire, the quality of the tire degrades, and it is difficult to conduct the tire test with high accuracy. Furthermore, if the rotation of the tire is accelerated to increase the rotational speed up to the specified rotational speed while the drum contacts the stationary tire, it disadvantageously takes longer warm-up time to accelerate the rotation of the tire to reach the specified rotational speed, resulting in longer cycle time for the test.

An object of the present invention is to provide a tire testing method and a tire testing machine capable of preventing occurrence of a slip between a tire and a drum and a flat spot on the tire and capable of reducing test cycle time at a time of testing the tire.

To obtain the object, a tire testing method according to one aspect of the present invention is a tire testing method conducted by a tire testing machine, the tire testing machine including a pair of spindles provided to be able to sandwich and to release a tire; a rotation mechanism provided for the paired spindles, and rotating the tire sandwiched between the paired spindles; and a drum including a moving mechanism that moves the drum in a direction of being close to or separate from the tire sandwiched between the paired spindles, pressed against the tire, and applying a load to the tire while rotating together with the tire, the tire testing method including: a tire sandwiching step of sandwiching the tire between the paired spindles; a tire predetermined-rotation step of controlling the rotation mechanism to drive the tire sandwiched between the paired spindles to rotate at a predetermined rotational speed lower than a specified rotational speed; a drum contact step of controlling the moving mechanism to move the drum until the drum contacts the tire rotating at the predetermined rotational speed; a tire specified-rotation step of accelerating rotation of the tire from the predetermined rotational speed to the specified rotational speed after contacting the drum with the tire; and a tire testing step of testing the tire rotating at the specified rotational speed.

A tire testing machine according to another aspect of the present invention is a tire testing machine including: a pair of spindles provided to be able to sandwich and to release a tire; a rotation mechanism provided for the paired spindles, and rotating the tire sandwiched between the paired spindles; a drum pressed against the tire, and applying a load to the tire while rotating together with the tire; a moving mechanism moving the drum in a direction of being close to or separate from the tire sandwiched between the paired spindles; and a control mechanism controlling the paired spindles to sandwich the tire therebetween, controlling the rotation mechanism to drive the tire sandwiched between the paired spindles to rotate at a predetermined rotational speed lower than a specified rotational speed, controlling the moving mechanism to move the drum until the drum contacts the tire rotating at the predetermined rotational speed, accelerating rotation of the tire from the predetermined rotational speed to the specified rotational speed after contacting the drum with the tire, and rotating the tire at the specified rotational speed before testing the tire.

According to the tire testing method and the tire testing machine, the tire already starts rotating at the predetermined rotational speed before the drum is pressed against the surface of the tire. Owing to this, it is difficult for a flat spot to occur even if the drum is pressed against the surface of the tire. Furthermore, because of the contact of the drum with the tire rotating at the rotational speed lower than the specified rotational speed, it is difficult for a slip to occur between the tire and the drum at the time of the initial rotation of the drum and, therefore, difficult to contaminate the surface of the drum with tire rubber. Moreover, it is possible to reduce warm-up time required until the tire is driven to rotate at the rotational speed equal to the rotational speed at the time of the contact of the drum with the tire (that is, it suffices to rotate the tire at not the specified rotational speed but the predetermined rotational speed lower than the specified rotational speed). It is, therefore, possible to reduce the test cycle time.

In the tire testing method according to one aspect of the present invention, the tire specified-rotation step may include increasing the load applied by the drum to the tire to a predetermined load while accelerating the rotation of the tire from the predetermined rotational speed to the specified rotational speed. Furthermore, in the tire testing machine according to another aspect of the present invention, the control mechanism may increases the load applied by the drum to the tire to a predetermined load while accelerating the rotation of the tire from the predetermined rotational speed to the specified rotational speed.

According to the tire testing method and the tire testing machine, right after detecting the contact between the tire and the drum, the rotation of the tire is accelerated from the predetermined rotational speed to the specified rotational speed. In addition, using the time required until the rotational speed of the tire reaches the specified rotational speed from the predetermined rotational speed, the load (drum load) that the drum applies to the tire is increased to the test load. It is thereby possible to increase the drum load to the test load by making effective use of the time for accelerating the rotation of the tire, which can contribute to reducing the test cycle time.

The tire testing method and the tire testing machine according to the aspects of the present invention can prevent occurrence of a slip between a tire and a drum and occurrence of a flat spot on the tire at a time of testing the tire, and can reduce test cycle time.

DESCRIPTION OF THE PREFERRED EMBODIMENTS

Figure 1:
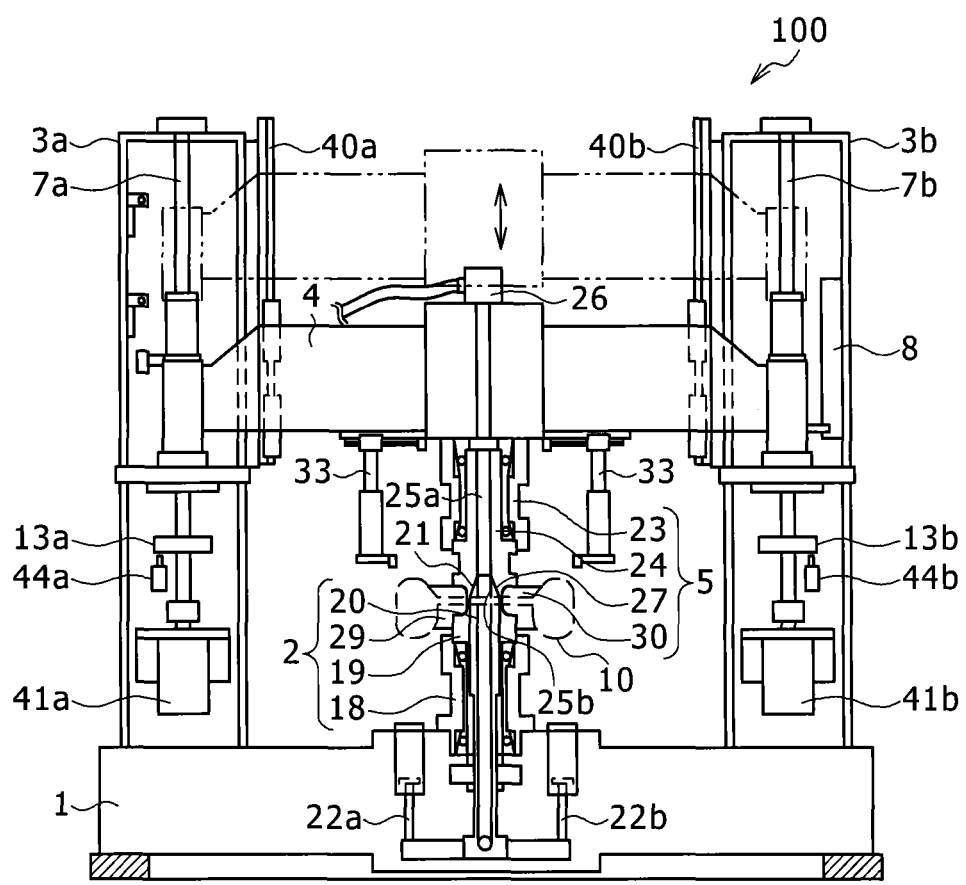
FIG. 1 is a side view illustrating a tire testing machine according to an embodiment of the present invention.

Hereinafter, embodiments of tire testing conveyors according to the present invention will be described according to a specific example by referring to the drawings.

It is to be noted that the embodiments described hereinafter are given only for illustrative purposes and are not intended to indicate applicable limits to a tire testing method and a tire testing machine according to the present invention. That is, the tire testing method and the tire testing machine according to the present invention are not limited to the following embodiments but various changes and modifications can be made of the tire testing method and the tire testing machine according to the present invention without departure of the scope of the claimed invention.

(Configuration of Tire Testing Apparatus)

An overall configuration of a tire testing apparatus 101 including a tire testing machine 100 according to an embodiment of the present invention will be described with reference to FIG. 1.

The tire testing apparatus 101 includes an inlet conveyor 35, a center conveyor 28, and an outlet conveyor 34 as well as the tire testing machine 100. The conveyors 35, 28, and 34 are arranged to transport a tire 10 that is a test target in a transport direction D.

(Configuration of Tire Testing Machine)

A configuration of the tire testing machine 100 will be described with reference to FIGS. 1, 2, and 4.

As shown in FIG. 1, the tire testing machine 100 includes a lower frame 1, a pair of vertical frames 3a and 3b mounted on the lower frame 1, linear guides 40a and 40b serving as slide guide units and each attached to the vertical frames 3a and 3b, a movable beam 4 bridged between the linear guides 40a and 40b, a lower chuck 2 attached to the lower frame 1 and serving as a fixed chuck, and an upper chuck 5 attached to the movable beam 4 and serving as a moving chuck.

The lower frame 1 is made of steel—for example, steel of a steel-sheet welded and laminated structure, H-type steel or I-type steel, and extends in a horizontal direction.

The vertical frames 3a and 3b are each made of steel—for example, steel of a steel-sheet welded and laminated structure or a square steel tube, and fixed to an upper surface of the lower frame 1 via bolts, nuts or the like. The vertical frames 3a and 3b are fixed to both ends of the lower frame 1, respectively, and extend vertically upward of the lower frame 1. The linear guides 40a and 40b are attached to opposing side surfaces of the vertical frames 3a and 3b, respectively. Ball screws (ball shafts) 7a and 7b are provided in the vertical frames 3a and 3b, respectively. The ball screws 7a and 7b extend in a vertical direction in internal spaces of the vertical frames 3a and 3b, respectively.

The movable beam 4 is made of steel—for example, steel of a steel-sheet welded and laminated structure, H-type steel or I-type steel, and both ends of the movable beam 4 are connected to nut parts of the ball screws 7a and 7b, respectively. The movable beam 4 is supported by the paired vertical frames 3a and 3b via the ball screws 7a and 7b and the linear guides 40a and 40b. The movable beam 4 moves upward or downward in proportion to the rotation of the ball screws 7a and 7b while being guided by the linear guides 40a and 40b. A linear sensor 8 provided on one of the vertical frames 3a and 3b (vertical frame 3b in the embodiment) detects a vertical position of the movable beam 4.

Motors 41a and 41b are directly coupled to lower ends of the ball screws 7a and 7b, respectively. These motors 41a and 41b rotate the respective ball screws 7a and 7b. The motors 41a and 41b are driven to be synchronized with each other.

Figure 2:
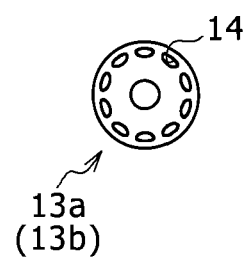
FIG. 2 is a plan view illustrating a circular disk of the tire testing machine according to the embodiment of the present invention.

Circular discs 13a and 13b in which many holes 14 are formed, as shown in FIG. 2, are provided in portions of the ball screws 7a and 7b between the motors 41a and 41b and the movable beam 4, respectively. That is, the circular discs 13a and 13b are fixed to the portions of the ball screws 7a and 7b between the motors 41a and 41b and the movable beam 4, respectively. Centers of the circular discs 13a and 13b are aligned with cores of the ball screws 7a and 7b, respectively.

Pins driven by air cylinders 44a and 44b are inserted into the respective holes 14 of the circular discs 13a and 13b, and the circular discs 13a and 13b are fixed to the respective portions, thereby stopping the rotation of the ball screws 7a and 7b. Thus, the circular discs 13a and 13b, the holes 14 of the circular discs 13a and 13b, the air cylinders 44a and 44b, and the pins driven by the air cylinders 44a and 44b function as a movable-beam stopping mechanism. If the air or gas (nitrogen gas, for example) is supplied into an internal space of the tire 10 sandwiched between the lower chuck 2 and the upper chuck 5, the movable beam 4 is fixed so as to be unmovable upward. The upper chuck 5 is thereby fixed to the lower chuck 2 via the movable beam 4 so as to be unmovable upward.

The numbers, dimensions of respective portions, arrangements (distances from the centers of the circular discs 13a and 13b and the like) of the holes 14 of the circular discs 13a and 13b shown in FIG. 2 are determined on the basis of pitches of the ball screws 7a and 7b and the like and not limited to those described or illustrated in the embodiment. Furthermore, the holes 14 are not necessarily "elongated holes" but may be "truly circular holes".

Each of the air cylinders 44a and 44b is constituted by a cylinder main body and the pins each having a circular cross-section. The pins constituting each of the cylinders 44a and 44b move forward or backward to or from the cylinder 44a or 44b in proportion to the pressure of the air supplied to or removed from the cylinder main body. The cylinder main body constituting each of the air cylinders 44a and 44b is fixed to a stationary object (fixed object) such as the vertical frame 3a or 3b.

The air cylinders 44a and 44b may be replaced by hydraulic cylinders or the like. Furthermore, an operator may manually insert the pins driven by the air cylinders 44a and 44b into the respective holes 14 of the circular discs 13a and 13b.

The upper chuck 5 is attached to the movable beam 4 so as to be located at a longitudinal center of the movable beam 4 and to extend downward from a lower surface of the movable beam 4.

The upper chuck 5 includes an outer housing 23 fixed to the movable beam 4, a rotatable upper spindle 24 arranged in the outer housing 23, an upper rim 30 fixed to an outer circumference of a lower end portion of the upper spindle 24, and a female taper 27 formed on the center side of the lower end portion of the upper spindle 24 so as to be gradually wider and open vertically downward toward a tip end.

A male taper 21 formed in an upper end portion of a plunger 20, to be described later, of the lower chuck 2 is inserted into and engaged with this female taper 27. The female taper 27 in the lower end portion of the upper spindle 23, that is, an inner side surface of the lower end portion of the upper spindle 24 is formed as an inclined surface inclined vertically at the same angle as that of the upper end portion of the plunger 20.

The upper rim 30 is arranged to surround the lower end portion of the upper spindle 24 and the upper rim 30 together with the upper spindle 24 is rotatable about a vertical axis.

An air supply passage 25a that is a hole allowing the air to pass through the hole from an upper end to a lower end is provided vertically inside of the upper spindle 24. The air supply passage 25a is connected to a rotary joint 26 arranged on an upper end of the movable beam 4.

The lower chuck 2 is attached to the lower frame 1 so as to be located at a longitudinal center of the lower frame 1 and to extend upward from an upper surface of the lower frame 1.

The lower chuck 2 includes an outer housing 18 fixed to the lower frame 1, a rotatable lower spindle 19 arranged in the outer housing 18, the extendible plunger 20 arranged in the lower spindle 19, and a lower rim 29 fixed to an upper end portion of the lower spindle 19.

Figure 3:
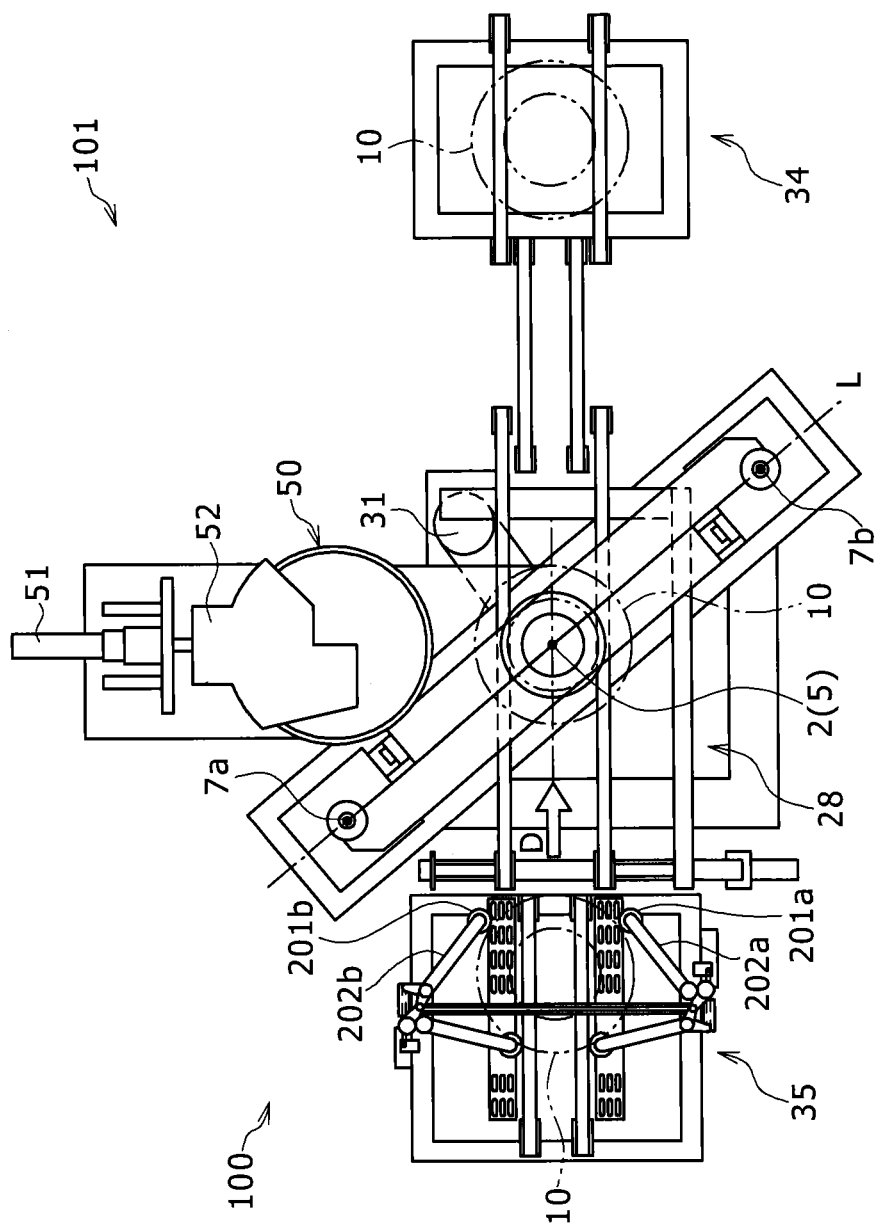
FIG. 3 is a plan view illustrating an entire tire testing apparatus including the tire testing machine according to the embodiment of the present invention.

The lower spindle 19 is connected to a motor (rotation mechanism) 31 shown in FIG. 3. The motor 31 drives the lower spindle 19 to rotate about a vertical axis. A rotational speed of the lower spindle 19 is controlled by a drive mechanism that the motor 31 includes. The plunger 20 together with the lower spindle 19 is rotatable about the vertical axis. In addition, the plunger 20 is vertically extensible (movable relatively to the lower spindle 19) by being driven by air cylinders 22a and 22b while the lower spindle 19 is vertically inextensible.

The plunger 20 is a rod member, and the taper convex (male taper) 21 having an inclined surface that is an outer side surface vertically inclined so as to be gradually narrower toward a tip end is formed in the upper end portion of the plunger 20. The lower rim 29 is arranged to surround an upper end portion of the lower spindle 19 and the lower rim 29 together with the lower spindle 19 is rotatable about a vertical axis.

Figure 4:
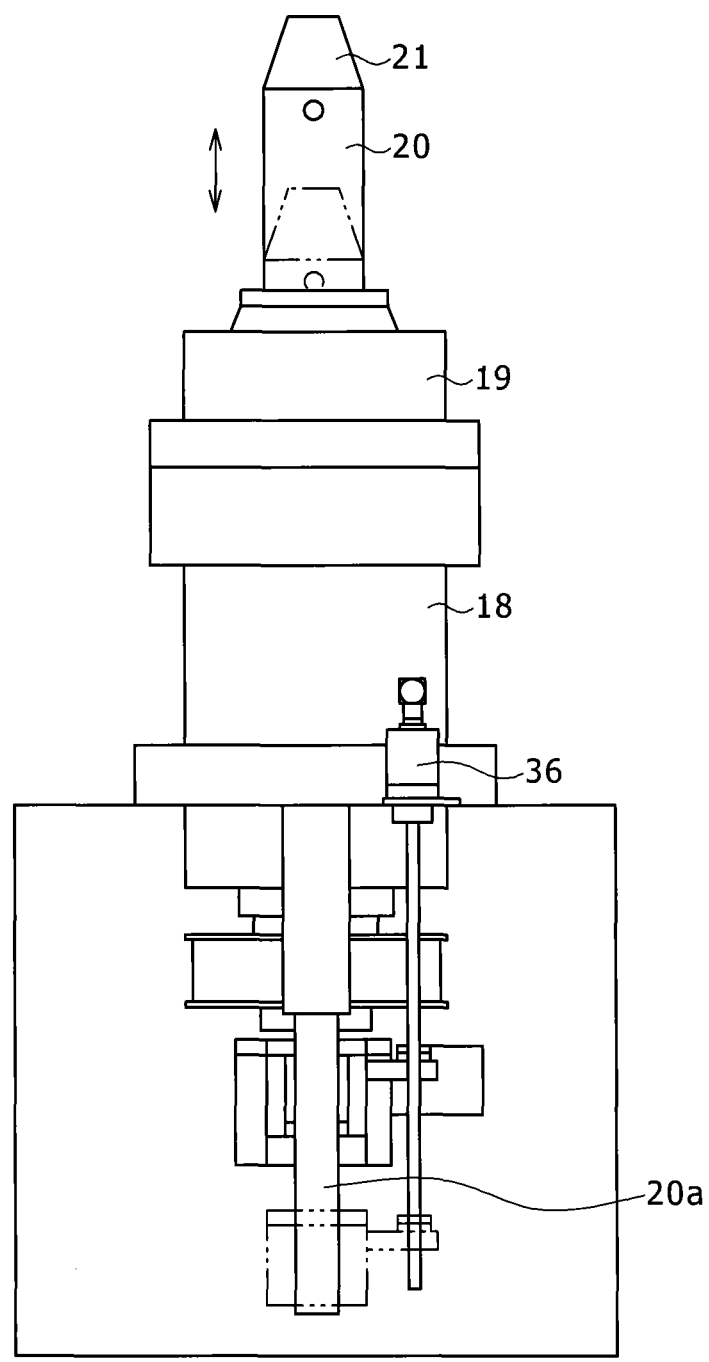
FIG. 4 is a side view illustrating a lower spindle of the tire testing machine according to the embodiment of the present invention.

A linear sensor 36 shown in FIG. 4 is attached to a guide member 20a shown in FIG. 4 of the plunger 20. The guide member 20a is fixed to the plunger 20 and moves together with the plunger 20. This linear sensor 36 is a sensor that detects a position (vertical position) of the upper chuck 5 (upper rim 30) relative to the lower chuck 2 (lower rim 29) and that is a digital linear sensor. Since the digital linear sensor is high in resolution, it is possible to accurately detect the position of the upper chuck 5 (upper rim 30) relative to the lower chuck 2 (lower rim 29) by using the linear sensor 36. The upper chuck 5 is positioned relatively to the lower chuck 2 in accordance with an extension amount of this plunger 20, and the pins are inserted into the holes 14 of the circular discs 13a and 13b with the upper chuck 5 being positioned.

The linear sensor 36 is not necessarily the digital linear sensor. Alternatively, an analog linear sensor can be used as the linear sensor 36. While the linear sensor 36 is attached to the plunger 28 itself, the linear sensor 36 may be a digital or an analog linear sensor included in each of the air cylinder 22a and 22b. To detect both stroke ends of the plunger 20, limit switches may be attached to the both stroke ends, respectively.

An air supply passage 25b is provided inside of the upper end portion of the plunger 20. This air supply passage 25b is a passage that communicates the air supply passage 25a provided in the upper spindle 24 with the internal space of the tire 10.

The upper chuck 5 and the lower chuck 2 are arranged at positions vertically facing each other, respectively at the longitudinal center of the lower frame 1. That is, the rotational axis of the lower spindle 19, the plunger 20, and the lower rim 29 of the lower chuck 2 matches that of the upper spindle 24 and the upper rim 30 of the upper chuck 5.

Furthermore, although not shown in FIG. 1, a load cell 37 (see FIG. 5) is arranged on a drum 50 for detecting a pressing load applied to the tire 10 by the drum 50, to be described later.

(Configuration of Drum in Tire Testing Machine)

Referring next to FIG. 3, a configuration of the drum 50 in the tire testing machine 100 will next be described.

The drum 50, which is of a flat cylinder shape, includes a rotary shaft provided at a center of the drum 50, and is pivotally supported by a support frame 52 so that the drum 50 is vertically rotatable. A motor (not shown) for rotating the drum 50 can be also coupled to a lower end of the rotary shaft of the drum 50.

The support frame 52 is equipped with a moving mechanism 51. The moving mechanism 51 moves the drum 50 in a horizontal direction along a direction almost orthogonal to the transport direction D via the support frame 52. The moving mechanism 51 can move the drum 50 and the support frame 52 integrally in the horizontal direction, that is, in the direction in which the drum 50 as well as the support frame 52 is close to or separate from the tire 10 sandwiched between the lower spindle 19 of the lower chuck 2 and the upper spindle 24 of the upper chuck 5. The moving mechanism 51 can be constituted by a ball screw or an air cylinder, which serves as a feed member, and a roller-added linear railway, rails machined surfaces of which face each other or the like, which serves or serve as a guide member.

(Configuration of Control Mechanism of Tire Testing Machine)

Figure 5:
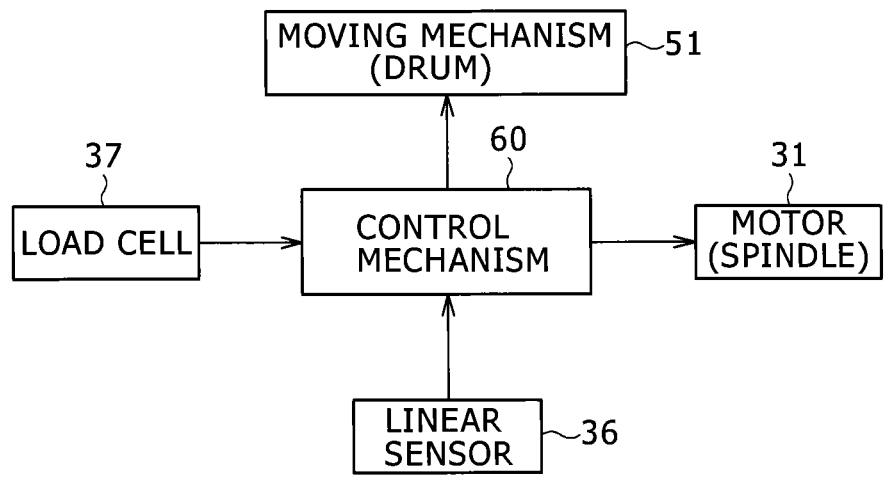
FIG. 5 is a block diagram illustrating a control mechanism of tire testing machine according to the embodiment of the present invention.

Referring to FIG. 5, a configuration of a control mechanism 60 of the tire testing machine 100 will be described.

The control mechanism 60 is constituted by a controller including a personal computer or the like, and the motor 31, the moving mechanism 51, and the linear sensor 36 are connected to the control mechanism 60. The control mechanism 60 receives a signal from the linear sensor 36 to detect that the tire 10 is sandwiched between the lower spindle 19 and the upper spindle 24, and receives a signal from the load cell 37 to detect the contact between the drum 50 and the tire 10. Furthermore, the control mechanism 60 controls the motor 31 to rotate the tire 10 sandwiched between the lower spindle 19 and the upper spindle 35, and controls the moving mechanism 51 to move the drum 50.

More specifically, the control mechanism 60 controls the motor 31 to drive the tire 10 sandwiched between the lower spindle 19 and the upper spindle 24 to rotate at a predetermined rotational speed lower than a specified rotational speed, when the linear sensor 36 detects that the tire 10 is sandwiched between the lower spindle 19 and the upper spindle 24. The control mechanism 60 also commands the moving mechanism 51 to move the drum 50 until the load cell 37 detects the contact of the drum 50 with the tire 10 that rotates at the predetermined rotational speed. The control mechanism 60 controls the motor 31 to drive the tire 10 to accelerate the rotation of the tire 10 sandwiched between the lower spindle 19 and the upper spindle 24 from the predetermined rotational speed to the specified rotational speed, when the load cell 37 detects the contact of the drum 50 with the tire 10.

The control mechanism 60 controls the motor 31 to drive the tire 10 to accelerate the rotation of the tire 10 sandwiched between the lower spindle 19 and the upper spindle 24 from the predetermined rotational speed to the specified rotational speed, when the load cell 37 detects the contact of the drum 50 with the tire 10. The control mechanism 60 also commands the moving mechanism 51 to move the drum 50 until the load cell 37 detects that a load that the drum 50 applies to the tire 10 is equal to a test load.

The specified rotational speed is preferably 60 rpm for a uniformity test, and the predetermined rotational speed is lower than 60 rpm, preferably as low as 10 to 30 rpm. The setting of the predetermined rotational speed to 10 to 30 rpm can exhibit the following effects. It is possible to make it difficult for a flat spot to occur even if the drum 50 is pressed against a surface of the tire 10, as compared with a state of rotating the tire 10 at the rotational speed lower than 10 rpm. It is also possible to make it more difficult for a slip to occur between the tire 10 and the drum 50 at a time of the initial rotation of the drum 50, as compared with a state of rotating the tire 10 at the rotational speed closer to 60 rpm, that is, the specified rotational speed.

(Tire Testing Method by Tire Testing Machine)

Figure 6:
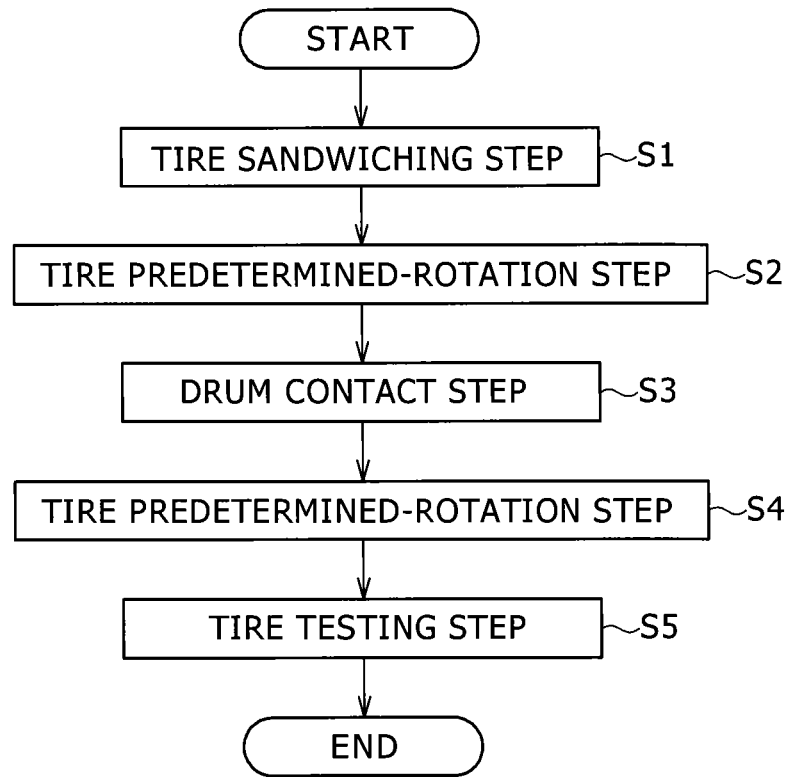
FIG. 6 is a flowchart illustrating process procedures of a tire testing method according to an embodiment of the present invention.

Processing procedures of a tire testing method for testing the tire 10 using the tire testing machine 100 described above will be described with reference to FIG. 6.

First, in the tire testing machine 100 described above, the tire 10 is sandwiched between the upper spindle 24 and the lower spindle 19 (S1: tire sandwiching step). Detailed processing procedures of the tire sandwiching step will be described.

The tire 10 is fed onto the inlet conveyor 35 shown in FIG. 3. The tire 10 is held at a predetermined position on the inlet conveyor 35 with holding rollers 201a, 201b provided on tip ends of swingable arm members 202a, 202b being in contact with an outer circumferential surface of the tire 10. The tire 10 rotates at the position to follow the rotation of the holding rollers, and lubricant is applied to a bead portion (not shown) of the tire 10 by a bead lubricating device (not shown). Thereafter, the tire 10 is fed from the inlet conveyor 35 onto the center conveyor 28 and transported to a position above (just above) the lower rim 29 of the lower chuck 2 shown in FIG. 1.

While the tire 10 is being fed from the inlet conveyor 35 to the position just above the lower rim 29 on the center conveyor 28, the movable beam 4 stops at either an uppermost position as a standby position or the standby position that is set according to a width of the tire 10 and at which the upper chuck 5 does not interfere with the tire 10. By setting the position of the movable beam 4 to the position as low as possible to the extent that the upper rim 30 does not interfere with the tire 10 in accordance with the width of the tire 10, it is possible to reduce time required for the upper chuck 5 via the movable beam 4 to move downward from the standby position to a test position to be described later.

After transporting the tire 10 to the position just above the lower rim 29, the center conveyor 28 moves downward while holding the tire 10 and mounts the tire 10 onto the lower rim 29. The movable beam 4 starts to move downward from the standby position almost simultaneously with the start of the downward movement of the center conveyor 28. The movable beam 4 moves downward to accompany the rotation of the ball screws 7a and 7b, and the linear sensor 8 controls the motors 41a and 41b to be driven while monitoring the position of the movable beam 4. The movable beam 4 is made to move downward until the linear sensor 28 detects that the male taper 21 present in the upper end position of the plunger 20 is engaged with the female taper 27 present in the lower end portion of the upper spindle 47 and that the movable beam 4 reaches the test position (position at which a distance between the lower rim 29 and the upper rim 30 is equal to a specified bead width according to the width of the tire 10), and secures the tire 10 between the upper chuck 5 and the lower chuck 2

Almost simultaneously with or after the start of the downward movement of the upper chuck 5 via the movable beam 4, the air cylinders 22a and 22b drive the plunger 20 of the lower chuck 2 to start extending upward. The male taper 21 present in the upper end portion of the plunger 20 is engaged with the female taper 27 present in the lower end portion of the upper chuck 7, whereby an axial center of the lower chuck 7 aligns with that of the upper chuck 2. The linear sensor 36 monitors the extension amount of the plunger 20, thereby monitoring the position of the upper chuck 5 relative to the lower chuck 2. On the basis of the extension amount of the plunger 20 detected by the linear sensor 36, the upper chuck 5 is positioned with the distance between the lower rim 29 and the upper rim 30 set appropriate for the secured tire 10. The linear sensor 36 outputs an indication of the positioning of the upper chuck 5 to the control mechanism 60. At this time, the movable-beam stopping mechanism functions, i.e., the air cylinders 44a and 44b drive the pins to be inserted into the holes 14 of the circular discs 13a and 13b, the ball screws 7a and 7b are fixed, and the upper chuck 5 is fixed to be unmovable upward via the movable beam 4. This can hold separating power after the inflation of the tire 10.

When the upper chuck 5 (upper rim 30) is positioned relatively to the lower chuck 2 (lower rim 29) in the vertical direction, the internal space of the tire 10 sandwiched between the upper and lower chucks 5 and 2 is closed. In this state, a solenoid valve (not shown) connected to the rotary joint 26 is driven to supply the compressed air into the internal space of the tire 10 via the air supply passages 25a and 25b, thereby inflating the tire 10. When a tire internal-pressure measuring device (not shown) determines that the air pressure of the tire 10 is equal to a predetermined pressure, the supply of the compressed air to the tire 10 stops.

Next, in the tire testing machine 100 described above, the tire 10 is rotated at the predetermined rotational speed (S2: tire predetermined-rotation step). Detailed processing procedures of the tire predetermined-rotation step will be described.

When the linear sensor 36 detects that the tire 10 is sandwiched between the lower spindle 19 and the upper spindle 24, the control mechanism 60 controls the motor 31, shown in FIG. 3, to starts driving the tire 10 sandwiched between the lower spindle 19 and the upper spindle 24 to rotate at the predetermined rotational speed lower than the specified rotational speed. When the motor 31 starts driving the tire 10, the plunger 20, the lower rim 29, the upper spindle 24, and the upper rim 30 together with the lower spindle 19 rotate about the same axis, whereby the tire 10 sandwiched between the lower spindle 19 and the upper spindle 24 rotates.

In the tire testing machine 100 described above, the control mechanism 60 controls the moving mechanism 51 to move the drum 50 until the drum 50 contacts the tire 10 that rotates at the predetermined rotational speed (S3: drum contact step). Detailed processing procedures of the drum contact step will be described.

The control mechanism 60 controls the moving mechanism 51 to move the drum 50 forward along the direction almost orthogonal to the transport direction D, and continuously moves the drum 50 until the load cell 37 detects the contact of the drum 50 with the tire 10 that rotates at the predetermined rotational speed.

Next, in the tire testing machine 100 described above, after the drum 50 contacts the tire 10 that rotates at the predetermined rotational speed, the control mechanism 60 controls the motor 31 to accelerate the rotation of the tire 10 from the predetermined rotational speed to the specified rotational speed (S4: tire specified-rotation step). Detailed processing procedures of the tire specified-rotation step will be described.

When the load cell 37 detects the contact of the drum 50 with the tire 10, the control mechanism 60 controls the motor 31 to drive the tire 10 to accelerate the rotation of the tire 10 sandwiched between the lower spindle 19 and the upper spindle 24 from the predetermined rotational speed to the specified rotational speed.

At this time, the control mechanism 60 controls the motor 31 to drive the tire 10 to accelerate the rotation of the tire 10 sandwiched between the lower spindle 19 and the upper spindle 24 from the predetermined rotational speed to the specified rotational speed. At the same time, the control mechanism 60 controls the moving mechanism 51 to move the drum 50 until the load cell 37 detects that the load applied by the drum 50 to the tire 10 is equal to the test load.

Next, the tire testing machine 100 tests the tire 10 in a state in which the tire 10 rotates at the specified rotational speed and in which the drum 50 is applying the test load to the tire 10 (S5: tire testing step). Steps after testing the tire 10 will be described in detail.

After the tire 10 is tested, the motor 31 continues to rotate the upper and lower spindles 24 and 19 so as to position the tire 10 at a to-be-marked position. At a moment at which the to-be-marked position on the tire 10 is directed downward of the feed of the tire 10, the motor 31 stops rotating the upper and lower spindles 24 and 19. Right after the end of testing the tire 10, the moving mechanism 51 can separate the drum 50 from the tire 10. In this case, it is possible to reduce cycle time. Alternatively, after the tire 10 is positioned at the to-be-marked position, the moving mechanism 51 can separate the drum 50 from the tire 10. In this case, it is possible to prepare for the next tire test after ensuring that the drum 50 stops. In another alternative, at a time at which the rotational speed reaches a certain rotational speed after the motor 31 starts to drive the tire 10 to decelerate the rotation thereof, the moving mechanism 51 can separate the drum 50 from the tire 10. In this case, it is possible to not only reduce the cycle time but also stop the drum 50 before the next tire test.

The solenoid valve connected to the rotary joint 26 releases the internal pressure of the tire 10. The air cylinders 44a and 44b are driven to pull out the pins from the holes 14 of the circular discs 13a and 13b, thereby unlocking the ball screws 7a and 7b. As a result, the movable beam 4 moves upward and the tire 10 abuts on tire strippers 33, thereby releasing the tire 10 from the upper rim 30. The upper chuck 5 moves upward via the movable beam 4 and, at the same time, the center conveyor 28 rises, thereby releasing the tire 10 from the lower rim 29. The center conveyor 28 moves tire 10 released from the upper and lower spindles 24 and 19 onto the outlet conveyor 34, where a necessary mark is applied onto the tire 10.

In this way, according to the tire testing machine 100 and the tire testing method, the tire 10 already starts rotating at the predetermined rotational speed before the drum 50 is pressed against the surface of the tire 10. Owing to this, it is difficult for a flat spot to occur even if the drum 50 is pressed against the surface of the tire 10. Furthermore, because of the contact of the drum 50 with the tire 10 rotating at the rotational speed lower than the specified rotational speed, it is difficult for a slip to occur between the tire 10 and the drum 50 at the time of the initial rotation of the drum 50 and, therefore, difficult to contaminate the surface of the drum 50 with tire rubber. Moreover, it is possible to reduce warm-up time required until the tire 10 is driven to rotate at the rotational speed equal to the rotational speed at the time of the contact of the drum 50 with the tire 10. That is, the warm-up time according to the conventional technique is time since the stop state until the rotation of the tire 10 at the specified rotational speed whereas the warm-up time according to the present embodiment is time since the stop state until the rotation of the tire 10 at the predetermined rotational speed lower than the specified rotational speed. It is, therefore, possible to reduce the test cycle time.

Furthermore, right after detecting the contact between the tire 10 and the drum 50, the rotation of the tire 10 is accelerated from the predetermined rotational speed (lower than 60 rpm, more preferably 10 to 30 rpm for the uniformity test) to the specified rotational speed (60 rpm for the uniformity test). In addition, using the time required until the rotational speed of the tire 10 reaches the specified rotational speed from the predetermined rotational speed, the load (drum load) that the drum 50 applies to the tire 10 is increased to the test load. It is thereby possible to increase the drum load to the test load by making effective use of the time for accelerating the rotation of the tire 10, which can contribute to reducing the test cycle time.

While the preferred embodiments of the present invention have been described so far, the present invention is not limited to those embodiments but various changes and modifications can be made of the invention without departure of the scope of the claimed invention.

For example, as for the control mechanism 60 in the tire testing machine 100 described above and the tire specified-number rotation step S4 in the tire testing method, the control mechanism 60 controls the motor 31 to drive the tire 10 to rotate so as to accelerate the rotation of the tire 10 from the predetermined rotational speed to the specified rotational speed. At the same time, the control mechanism 60 controls the moving mechanism 51 to move the drum 50 until the load cell 37 detects that the load applied by the drum 50 to the tire 10 is equal to the test load. However, the present invention is not limited thereto. For example, in the tire specified-number rotation step S4, if the load cell 37 detects the contact of the drum 50 with the tire 10, the control mechanism 60 controls the motor 31 to drive the tire 10 to accelerate the rotation of the tire 10 from the predetermined rotational speed to the specified rotational speed while keeping the load at the time of the contact of the drum 50 with the tire 10 by controlling the moving mechanism 51 to stop moving the drum 50. Thereafter, the control mechanism 60 controls the moving mechanism 51 to move the drum 50 until the load cell 37 detects that the load applied by the drum 50 to the tire 10 is equal to the test load after the rotational speed of the tire 10 reaches the specified rotational speed.

What is claimed is:

1. A tire testing method conducted by a tire testing machine, the tire testing machine including a pair of spindles provided to be able to sandwich and to release a tire; a rotation mechanism provided for the paired spindles, and rotating the tire sandwiched between the paired spindles; and a drum including a moving mechanism that moves the drum in a direction of being close to or separate from the tire sandwiched between the paired spindles, pressed against the tire, and applying a load to the tire while rotating together with the tire, the tire testing method comprising:

a tire sandwiching step of sandwiching the tire between the paired spindles;

a tire predetermined-rotation step of controlling the rotation mechanism to drive the tire sandwiched between the paired spindles to rotate at a predetermined rotational speed lower than a specified rotational speed;

a drum contact step of controlling the moving mechanism to move the drum until the drum contacts the tire rotating at the predetermined rotational speed;

a tire specified-rotation step of accelerating rotation of the tire from the predetermined rotational speed to the specified rotational speed after contacting the drum with the tire; and a tire testing step of testing the tire rotating at the specified rotational speed.

2. The tire testing method according to claim 1, wherein the tire specified-rotation step includes increasing the load applied by the drum to the tire to a predetermined load while accelerating the rotation of the tire from the predetermined rotational speed to the specified rotational speed.

3. A tire testing machine comprising:

a pair of spindles provided to be able to sandwich and to release a tire;

a rotation mechanism provided for the paired spindles, and rotating the tire sandwiched between the paired spindles;

a drum pressed against the tire, and applying a load to the tire while rotating together with the tire;

a moving mechanism moving the drum in a direction of being close to or separate from the tire sandwiched between the paired spindles; and a control mechanism controlling the paired spindles to sandwich the tire therebetween, controlling the rotation mechanism to drive the tire sandwiched between the paired spindles to rotate at a predetermined rotational speed lower than a specified rotational speed, controlling the moving mechanism to move the drum until the drum contacts the tire rotating at the predetermined rotational speed, accelerating rotation of the tire from the predetermined rotational speed to the specified rotational speed after contacting the drum with the tire, and rotating the tire at the specified rotational speed before testing the tire.

4. The tire testing machine according to claim 3, wherein the control mechanism increases the load applied by the drum to the tire to a predetermined load while accelerating the rotation of the tire from the predetermined rotational speed to the specified rotational speed.

* * * * *